US012801371B2

(12) United States Patent
Jo et al.

(10) Patent No.: US 12,801,371 B2
(45) Date of Patent: Nov. 17, 2026

(54) APPARATUS AND METHOD FOR WIRELESS UPDATING OF A SMART KEY

(71) Applicants: HYUNDAI MOTOR COMPANY, Seoul (KR); KIA CORPORATION, Seoul (KR)

(72) Inventors: Sung Jin Jo, Seoul (KR); Young Kwon Jang, Hwaseong-si (KR); Woo Won Hwang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 252 days.

(21) Appl. No.: 18/673,898

(22) Filed: May 24, 2024

(65) Prior Publication Data

US 2025/0123831 A1 Apr. 17, 2025

(30) Foreign Application Priority Data

Oct. 12, 2023 (KR) ........................ 10-2023-0136097

(51) Int. Cl.
*G06F 8/65* (2018.01)
*H04L 67/12* (2022.01)

(52) U.S. Cl.
CPC ................ *G06F 8/65* (2013.01); *H04L 67/12* (2013.01)

(58) Field of Classification Search
None
See application file for complete search history.

(56) References Cited

U.S. PATENT DOCUMENTS

2019/0168713 A1* 6/2019 Jun .................... G07C 9/00309
2022/0121436 A1* 4/2022 Bang .......................... G06F 8/60
2025/0175353 A1* 5/2025 Ou ........................ H04L 9/3268

* cited by examiner

*Primary Examiner* — Ari Shahabi
(74) *Attorney, Agent, or Firm* — Lempia Summerfield Katz LLC

(57) ABSTRACT

A smart key wireless update control apparatus and method are disclosed. The smart key wireless update control apparatus includes a communication device configured to wirelessly receive information for a wireless update of smart key software from a server outside a vehicle. The apparatus also includes a processor configured to perform the wireless update of the smart key software according to presence or absence of a smart key in the vehicle and a number of smart keys present in the vehicle. The apparatus also includes a storage configured to store data and algorithms driven by the processor.

17 Claims, 5 Drawing Sheets

APPARATUS AND METHOD FOR WIRELESS UPDATING OF A SMART KEY

CROSS-REFERENCE TO RELATED APPLICATION

This application claims priority to and the benefit of Korean Patent Application No. 10-2023-0136097, filed in the Korean Intellectual Property Office on Oct. 12, 2023, the entire contents of which are incorporated herein by reference.

BACKGROUND

(a) Technical Field

The present disclosure relates to a smart key wireless update control apparatus and a method therefor, and more particularly, to a technique for wirelessly updating software of a vehicle smart key.

(b) Description of the Related Art

With development in the vehicle industry, development of a system to provide various services using a wireless communication technique is continuously being made in order to provide convenience to a driver. For example, a vehicle may update software of a controller mounted on the vehicle through wireless communication (over the air (OTA)).

During an update of software of a controller of such vehicles, a vehicle communication module receives information related to the update from an OTA update server, and the vehicle communication module transmits information related to the update to an internal update target controller.

However, in a case of a smart key, in response to a case where quality problems occur or software changes are required, such as function addition, wireless or wired reprogramming is not possible. Thus, quality and functionality could be improved by replacing the product itself.

Accordingly, in replacing a smart key, there is the inconvenience of having to visit the service center in person. Also, in replacing a product, there is a problem that costs are excessive due to both part costs and various labor costs.

Accordingly, efforts were made to develop a wireless update method for a smart key, like a vehicle internal controller. However, in a case of the smart key, battery capacity is small, and a time that a driver is inside the vehicle with the smart key is limited. Unlike an in-vehicle controller connected to a wired network, there is a restriction that only wireless updates may be performed. Thus, there is a problem in that wireless updating of the smart key is not easy.

SUMMARY

The present disclosure attempts to provide apparatus and method for wireless updating of a smart key.

An embodiment of the present disclosure provides a vehicle update control apparatus and method for performing a wireless update of smart key software based on wireless communication.

Furthermore, an embodiment of the present disclosure provides a smart key wireless update control apparatus and method for wirelessly updating smart key software in response to a case where a vehicle is not in a stop condition.

The technical objects of the present disclosure are not limited to the objects mentioned above. Other technical objects not mentioned herein may be more clearly understood by those having ordinary skill in the art from the present disclosure.

An embodiment of the present disclosure provides a smart key wireless update control apparatus. The apparatus includes a communication device configured to wirelessly receive information for a wireless update of smart key software from a server outside a vehicle. The apparatus also includes a processor configured to perform the wireless update of the smart key software according to presence or absence of a smart key in the vehicle and a number of smart keys present in the vehicle. The apparatus also includes a storage configured to store data and algorithms driven by the processor.

In an embodiment of the present disclosure, the processor may be configured to determine whether a smart key is present in the vehicle according to opening and closing of a door of the vehicle.

In an embodiment of the present disclosure, the processor may be configured, in response to a case where there is one smart key in the vehicle, to determine at least one of a case where a vehicle ignition is off, a case where the vehicle is not under maintenance, a case where a remaining battery capacity of the vehicle is equal to or greater than a predetermined reference, or a combination thereof.

In an embodiment of the present disclosure, the processor may be configured to determine that the vehicle ignition is off in response to a case where a vehicle gear is in P or an exterior lamp is turned off.

In an embodiment of the present disclosure, the processor may be configured to determine that the vehicle is under maintenance in response to a case where a hood of the vehicle is open.

In an embodiment of the present disclosure, the processor may be configured to determine whether a battery state of the smart key is equal to or greater than a predetermined reference.

In an embodiment, the method may further include an interface device configured to display progress details of a wireless update of software of the smart key.

In an embodiment of the present disclosure, the processor may be configured to control a notification to an interface device or a mobile communication terminal of a user that a preparation for the wireless update of the software of the smart key is completed in response to the case where the vehicle ignition is off, the case where the vehicle is not under maintenance, and the case where the remaining battery capacity of the vehicle is equal to or greater than the predetermined reference.

In an embodiment of the present disclosure, the processor may be configured to request approval from the user to start the wireless update of the software of the smart key through the interface device or the mobile communication terminal of the user after the preparation for the wireless update of the software of the smart key is completed. The processor may also be configured, in response to the approval by the user, to start the wireless update of the software of the smart key.

In an embodiment of the present disclosure, the processor may be configured, in response to a case where there are two or more smart keys in the vehicle, while the vehicle is stopped or driving, to determine whether a remaining battery capacity of a first smart key and a second smart key is greater than or equal to a predetermined reference.

In an embodiment of the present disclosure, the processor may be configured, in response to a case where the remaining battery capacity of the first smart key and the second smart key is greater than the predetermined reference, to notify the user that the preparation for the wireless update of the software of the first smart key and the second smart key is completed.

In an embodiment of the present disclosure, the processor may be configured, in response to receiving the approval from the user to start the wireless update of the software of the first smart key and the second smart key, to sequentially perform the wireless update of the software of the first smart key and the second smart key.

In an embodiment of the present disclosure, the processor may be configured to determine whether the wireless update of the software of the first smart key has been successfully completed after the wireless update of the software of the first smart key has been performed.

In an embodiment of the present disclosure, the processor may be configured to determine whether the wireless update of both of the first smart key and the second smart key in the vehicle has been completed in response to a case where the wireless update of the software of the first smart key is successfully completed.

In an embodiment of the present disclosure, the processor may be configured, in response to a case where the wireless update of both of the first smart key and the second smart key in the vehicle is completed, to notify the user that the wireless update of the first smart key and the second smart key in the vehicle has been completed.

In an embodiment of the present disclosure, the processor may be configured, in response to a case where the wireless update of the software of the first smart key is not successfully completed, to start wireless updating of the software of the second smart key for which the wireless update has not been completed.

In an embodiment of the present disclosure, the processor may be configured, in response to a case where the wireless update of the software of the first smart key fails, to determine whether a number of retries for the wireless update is smaller than or equal to a predetermined number.

In an embodiment of the present disclosure, the processor may be configured to retry the wireless update of the software of the first smart key in response to a case where the number of retries for the wireless update is smaller than or equal to the predetermined number.

In an embodiment of the present disclosure, the processor may be configured to perform a rollback to an existing version of the software of the first smart key. The processor may be also configured to inform the user that the wireless update of the software of the first smart key has failed in response to a case where the number of retries for the wireless update exceeds the predetermined number.

An embodiment of the present disclosure provides a smart key wireless update control method. The method includes determining, by a processor, whether a smart key exists in a vehicle and a number of smart keys present in the vehicle. The method also includes wirelessly, by the processor, receiving information for a wireless update of smart key software from a server outside a vehicle. The method also includes performing, by the processor, the wireless update of the smart key software according to presence or absence of a smart key in the vehicle and a number of smart keys present in the vehicle.

According to the present technique, wireless update of smart key software may be performed based on wireless communication, and thus user convenience may be increased.

Furthermore, according to the present disclosure, a vehicle use restriction for a user who is able to wirelessly update smart key software may be reduced in response to a case where a vehicle is in a stop condition.

Furthermore, various effects, which may be directly or indirectly identified through the present disclosure, may be provided.

DETAILED DESCRIPTION

Figure 1:
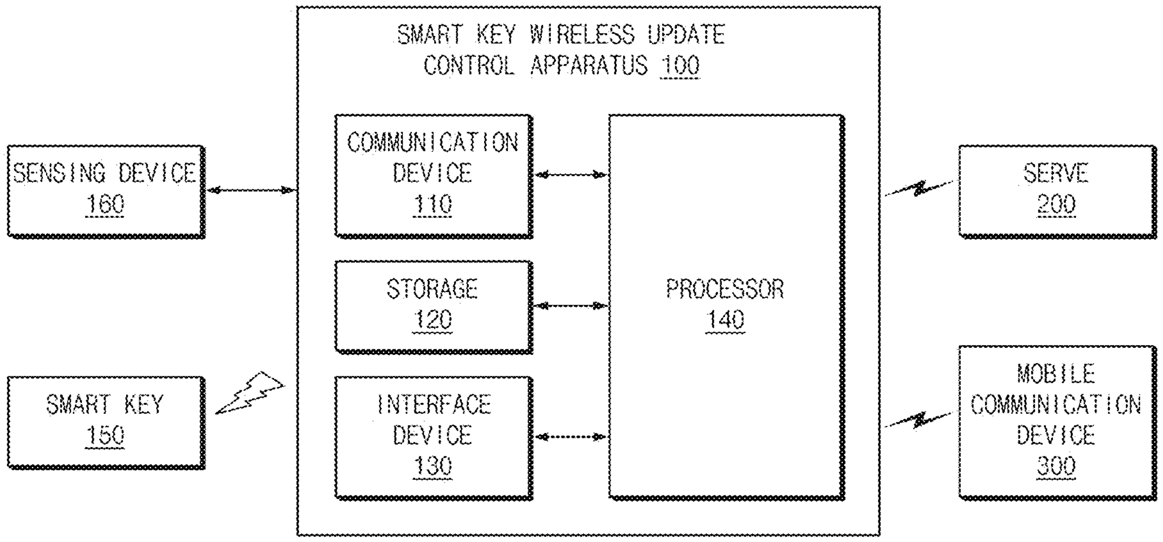
FIG. 1 illustrates a block diagram showing a configuration of an example system including a smart key wireless update control apparatus.

Hereinafter, some embodiments of the present disclosure are described in detail with reference to drawings. It should be noted that, in adding reference numerals to constituent elements of each drawing, the same or equivalent constituent elements include the same reference numerals as possible even though they are indicated on different drawings. In describing an embodiment of the present disclosure, where it has been determined that a detailed description of the well-known configuration or function associated with the embodiment of the present disclosure may have obscured the gist of the present disclosure, the detailed description has been omitted.

In describing constituent elements according to an embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms include the same meanings as those which are generally understood by those having ordinary skill in the art of the present disclosure to which an embodiment of the present disclosure pertains unless the terms are differently defined. Terms defined in a generally used dictionary shall be construed to include meanings matching those in the context of a related art and shall not be construed to include idealized or excessively formal meanings unless the terms are clearly defined in the present disclosure. When a component, device, element, or the like of the present disclosure is described as having a purpose or performing an operation, function, or the like, the component, device, element, or the like should be considered herein as being “configured to” meet that purpose or to perform that operation or function. Each component, device, element, and the like may separately embody or be included with a processor and a memory, such as a non-transitory computer readable media, as part of the apparatus.

Hereinafter, various embodiments of the present disclosure are described in detail with reference to FIGS. 1-5.

FIG. 1 illustrates a block diagram showing a configuration of an example vehicle system including a smart key wireless update control apparatus.

Referring to FIG. 1, the smart key wireless update control apparatus 100 according to an embodiment may be configured to perform wireless communication with a server 200 and a mobile communication terminal 300 outside a vehicle.

According to an embodiment of the present disclosure, the smart key wireless update control apparatus 100 may be implemented within or separately from the vehicle. In the instant case, the smart key wireless update control apparatus 100 may be integrally formed with internal control units of the vehicle or may be implemented as a separate hardware device to be connected to control units of the vehicle by a connection means. For example, the smart key wireless update control apparatus 100 may be implemented integrally with the vehicle, may be implemented in a form that is installed or attached to the vehicle as a configuration separate from the vehicle, or a part thereof may be implemented integrally with the vehicle, and another part may be implemented in a form that is installed or attached to the vehicle as a configuration separate from the vehicle.

The smart key wireless update control apparatus 100 may be configured to wirelessly update software of a smart key 150 according to presence or absence of the smart key 150 in the vehicle and a number of smart keys 150 present in the vehicle.

The smart key wireless update control apparatus 100 may include a communication device 110, a storage 120, an interface device 130, and a processor 140. According to an embodiment of the present disclosure, the smart key wireless update control apparatus 100 may be implemented as a single unit by coupling components with each other, and some components may be omitted.

The communication device 110 is a hardware device implemented with various electronic circuits to transmit and receive signals through a wireless or wired connection and may transmit and receive information based on in-vehicle devices and in-vehicle network communication techniques. As an embodiment of the present disclosure, the in-vehicle network communication techniques may include Controller Area Network (CAN) communication, Local Interconnect Network (LIN) communication, flex-ray communication, and the like.

The communication device 110 may include a mobile communication module, a wireless Internet module, a short-range communication module, etc. for wireless communication.

The mobile communication technique may be configured to communicate with the server 200 and the mobile communication terminal 300 through a mobile communication network established according to technical standards or communication methods for mobile communication (e.g., global system for mobile communication (GSM), code division multi access (CDMA), code division multi access 2000 (CDMA 2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 4th generation mobile telecommunication (4G), 5th generation mobile telecommunication (5G)).

The wireless Internet module is a module for wireless Internet access and may be configured to communicate with the server 200 and the mobile communication terminal 300 through wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), etc.

The short-range communication module may be configured to support short-range communication with the smart Key 150 etc. by using at least one of Bluetooth™, radio frequency identification (RFID), infrared data association (IrDA), ultra wideband (UWB), ZigBee, near field communication (NFC), a wireless universal serial bus (USB) technique, or any combination thereof.

As an example, the communication device 110 may be configured to receive information (e.g., software) for an update from the server 200. Furthermore, the communication device 110 may be configured to perform UWB communication or two-way RF communication with the smart key 150.

The storage 120 may store a sensing result received from the sensing device 160, information for update received from the server 20, data and/or algorithms required for the processor 140 to operate, and the like.

As an embodiment of the present disclosure, the storage 120 may store in advance a number of retries to retry updating the smart key. Furthermore, the storage 120 may store the update information received from the server 200.

The storage 120 may include a storage medium of at least one type among memories of types, such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button and may include a mouse, a joystick, a jog shuttle, a stylus pen, and the like. Furthermore, the input means may include a soft key implemented on the display.

The output device may include a display and may also include a voice output means such as a speaker. In the instant case, in a response to a case that a touch sensor formed of a touch film, a touch sheet, or a touch pad is provided on the display, the display may operate as a touch screen and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

The interface device 130 may be implemented as a head-up display (HUD), a cluster, an audio video navigation (AVN), or a human machine interface (HM), a human machine interface (HMI).

As an embodiment of the present disclosure, the interface device 130 may output a wireless update progress history of the smart key and notification information for approval to start updating the smart key, etc.

The processor 140 may be electrically connected to the communication device 110, the storage 120, the interface device 130, and the like, may electrically control each component, and may be an electrical circuit that executes software commands. Thus, the processor 140 may perform various data processing and calculations described below.

The processor 140 may be configured to process a signal transferred between components of the smart key wireless update control apparatus 100 to perform overall control such that each of the components may perform its function normally. The processor 140 may be implemented in the form of hardware, software, or a combination of and software. For example, the processor 140 may be implemented as a microprocessor, but the present disclosure is not limited thereto. For example, it may be, e.g., an electronic control unit (ECU), a micro controller unit (MCU), or other sub-controllers mounted in the vehicle.

The processor 140 may be configured to wirelessly update software of a smart key 150 according to presence or absence of the smart key 150 in the vehicle and a number of smart keys 150 present in the vehicle.

The processor 140 may be configured to determine whether the smart key 150 exists in the vehicle according to opening and closing of a vehicle door.

In response to a case where there is one smart key 150 in the vehicle, the processor 140 may be configured to determine at least one of a case where a vehicle ignition is off, a case where the vehicle is not under maintenance, a case where a remaining battery capacity of the vehicle is equal to or greater than a predetermined reference, or a combination thereof.

The processor 140 may be configured to determine that the vehicle ignition is off in response to a case where a vehicle gear is in P or an exterior lamp is turned off.

The processor 140 may be configured to determine that the vehicle is under maintenance in response to a case where a hood of the vehicle is open.

The processor 140 may be configured to determine whether a battery state of the smart key 150 is equal to or greater than a predetermined reference.

The processor 140 may be configured to control a notification to an interface device or a mobile communication terminal of a user that a preparation for a wireless update of the software of the smart key 150 is completed in response to the case where the vehicle ignition is off, the case where the vehicle is not under maintenance, and the case where the remaining battery capacity of the vehicle is equal to or greater than the predetermined reference.

After the preparation for the wireless update of the software of the smart key 150 is completed, the processor 140 may be configured to request approval from the user to start the wireless update of the software of the smart key 150 through the interface device or the mobile communication terminal of the user. The processor 140 may be configured, in response to the approval by the user, to start the wireless update of the software of the smart key 150.

In response to a case where there are two or more smart keys in the vehicle, the processor 140 may be configured to determine whether a remaining battery capacity of a first smart key and a second smart key is greater than or equal to a predetermined reference while the vehicle is stopped or driving.

In response to a case where the remaining battery capacity of the first smart key and the second smart key is greater than the predetermined reference, the processor 140 may be configured to notify the user that preparation for the wireless update of the software of the first smart key and the second smart key is completed.

The processor 140 may be configured to sequentially perform the wireless update of the software of the first smart key and the second smart key in response to receiving approval from the user to start the wireless update of the software of the first smart key and the second smart key.

The processor 140 may be configured to determine whether the wireless update of the software of the first smart key has been successfully completed after the wireless update of the software of the first smart key has been performed.

In response to a case where the wireless update of the software of the first smart key is successfully completed, the processor 140 may be configured to determine whether the wireless update of both of the two smart keys in the vehicle has been completed.

In response to a case where the wireless update of both of the two smart keys in the vehicle is completed, the processor 140 may be configured to notify the user that the wireless update of the two smart keys in the vehicle has been completed.

In response to a case where the wireless update of both of the two smart keys in the vehicle is not completed, the processor 140 may be configured to start wireless updating of the software of the second smart key for which the wireless update has not been completed.

In response to a case where the wireless update of the software of the first smart key fails, the processor 140 may be configured to determine whether a number of retries for the wireless update is smaller than or equal to a predetermined number.

The processor 140 may be configured to retry the wireless update of the software of the first smart key in response to a case where the number of retries for the wireless update is smaller than or equal to the predetermined number.

In response to a case where the number of retries for the wireless update exceeds the predetermined number, the processor 140 may be configured to perform a rollback to an existing version of the software of the first smart key and may be configured to inform the user that the wireless update of the software of the first smart key has failed.

The smart key 150 is a key that may open or close a vehicle door or start the engine without inserting or manipulating a separate key and may include unique identification information embedded therein. For example, a smart key may include a FOB key.

The smart key 150 may transmit the unique identification information to an electronic control unit (ECU) installed in the vehicle. A smart key electronic control device may read the received unique identification information. In response to successful user authentication, the smart key electronic control device may execute vehicle door opening/closing or an engine control command.

The sensing device 160 may detect whether a user enters or exits the vehicle. To the present end, the sensing device 160 may include a door detection sensor or the like. The door detection sensor may detect the opening or closing of the door and may provide a result thereof to the processor 140. Accordingly, the processor 140 may be configured to determine that the user has entered (boarded) the vehicle in response to a case where the door is opened and then closed. The processor 140 may be configured to initiate a wireless update logic of the smart key by searching for authentication methods within the vehicle in response to the user entering (riding) the vehicle.

Additionally, the sensing device 160 may detect an obstacle and the like outside the vehicle and may provide a result thereof to the processor 140. Accordingly, the processor 140 may be configured to determine a dangerous situation of the vehicle based on the sensing result of the sensing device 160 and may be configured to stop performing the wireless update in a case of the dangerous situation in the vehicle.

To the present end, the sensing device 160 may include one or more sensors that measure a distance and/or a relative speed of the obstacle.

In other words, the sensing device 160 may include a plurality of sensors configured to sense an external object of the vehicle. The plurality of sensors is also configured to obtain information related to a position of the external object, a speed of the external object, a moving direction of the external object, and/or a type of the external object (e.g., vehicles, pedestrians, bicycles or motorcycles, etc.). To the present end, the sensing device 160 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, etc.

Figure 2:
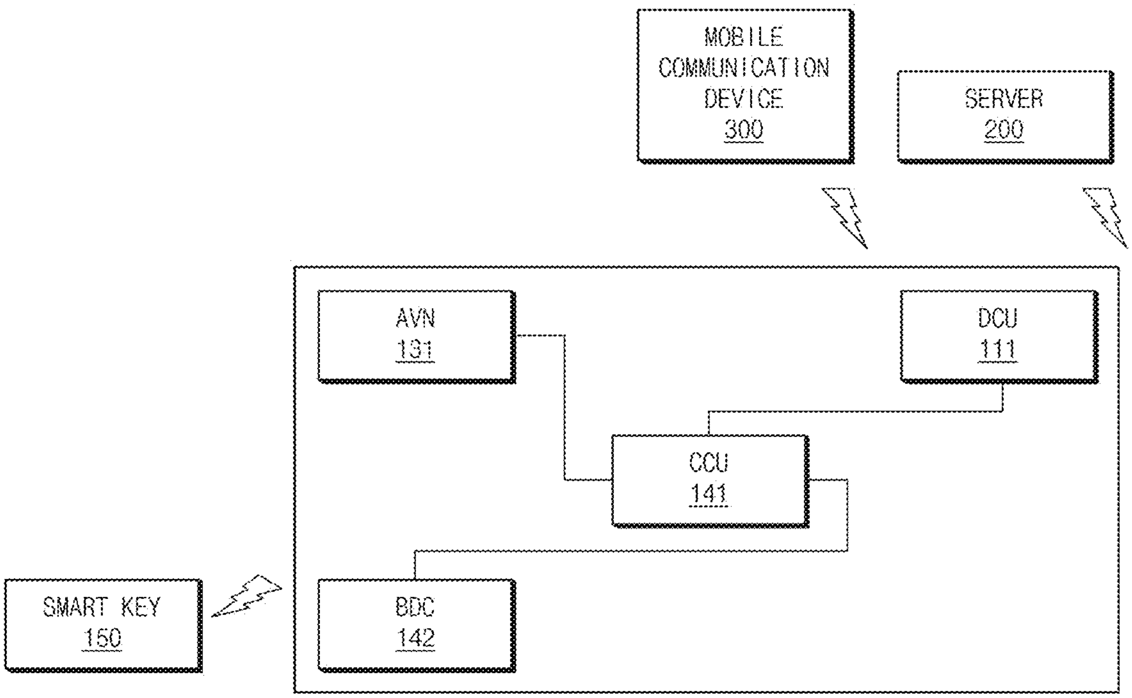
FIG. 2 illustrates a block diagram showing a configuration of an example smart key wireless update control apparatus.

FIG. 2 illustrates a block diagram showing a configuration of an example smart key wireless update control apparatus.

Referring to FIG. 2, the smart key wireless update control apparatus 100 may include a data connectivity unit (DCU) 111, an audio video navigation (AVN) 131, a central communication unit (CCU) 141, and a body domain controller (BDC) 142.

As a modem, the DCU 111 may receive wireless update information from the server 200 and may transmit wireless update progress details to the mobile communication terminal 300.

The AVN 131 may display the wireless update progress details of the smart key on a screen. Although not illustrated in FIG. 2, the wireless update progress details of the smart key may be displayed through a cluster or the like. For example, notifications may be made through the cluster in response to a case where the wireless update of the smart key fails or succeeds.

The CCU 141, which is an in-vehicle communication gateway, may store ROM data, which is information for wireless update of the smart key transferred through the DCU 111 for update.

The BDC 142 may wirelessly relay ROM data for the wireless update of the smart key. In other words, the BDC 142 may perform the wireless update by communicating with the smart key 150 under control of the CCU 141 and transmitting information for the wireless update to the smart key 150.

In response to a smart key wireless update information request being received via the DCU 111, the server 200 may transmit information for smart key wireless update to the DCU 111 and may manage a smart key wireless update file.

Figure 3:
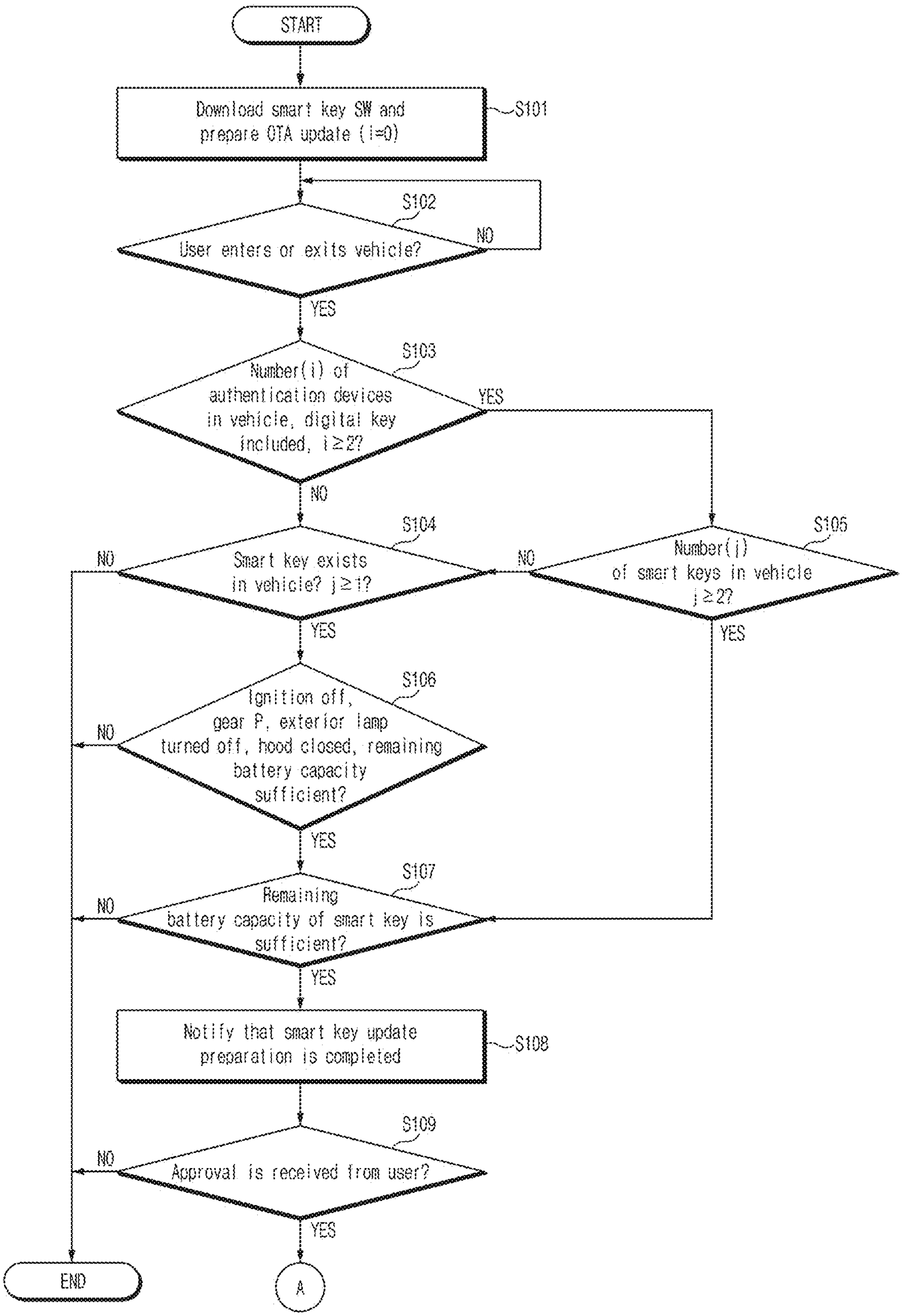
FIG. 3 is a flowchart illustrating an example smart key wireless update control method.
Figure 4:
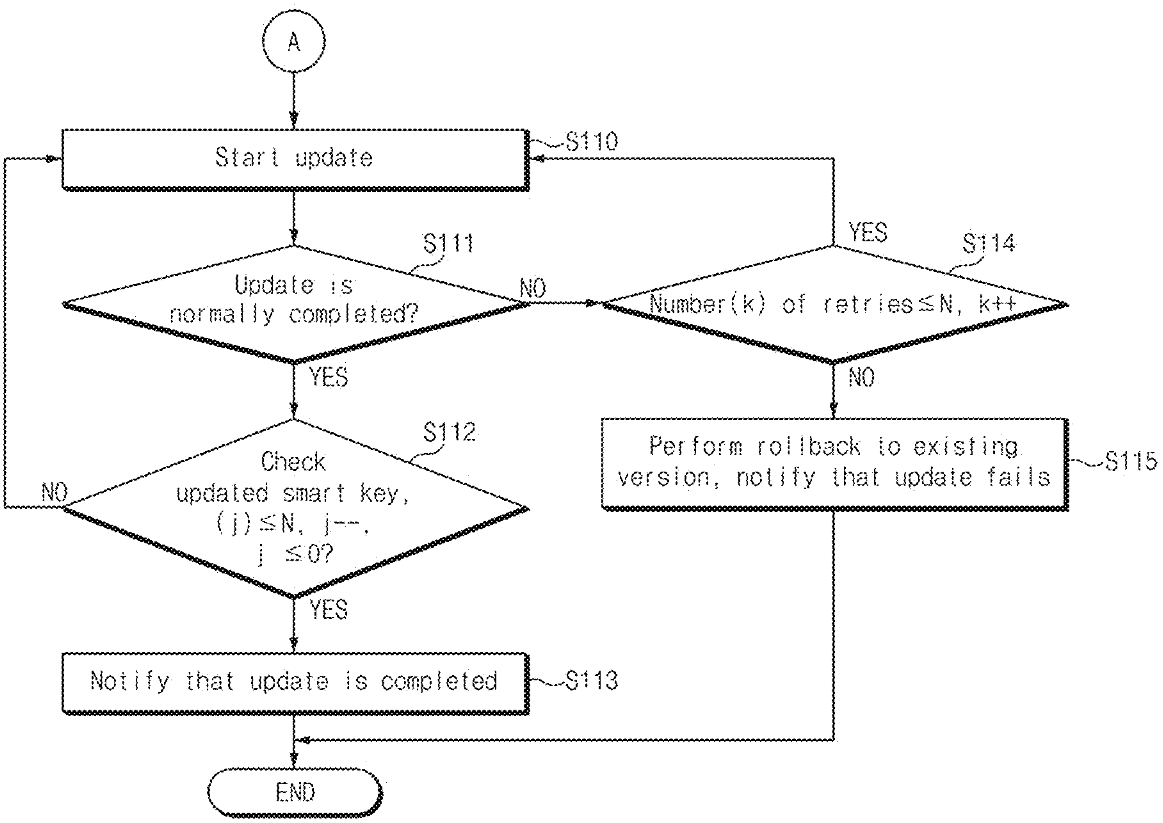
FIG. 4 illustrates a flowchart showing an example smart key wireless update control method.

Hereinafter, a smart key wireless update control apparatus configured to an embodiment of the present disclosure will be described with reference to FIG. 3 and FIG. 4. FIG. 3 and FIG. 4 each illustrate a flowchart for describing an example smart key wireless update control method.

Hereinafter, it is assumed that the smart key wireless control apparatus 100 of FIG. 1 performs the processes of FIG. 3 and FIG. 4. Furthermore, in the description of FIG. 3 and FIG. 4, operations described as being performed by the device may be understood as being controlled by the processor 140 of the smart key wireless update control apparatus 100. In following embodiments, operations of steps S101 to S115 may be performed sequentially but are not necessarily performed sequentially. For example, an order of each operation may be changed, and at least two operations may be performed in parallel.

Referring to FIG. 3, the smart key wireless update control apparatus 100 may be configured to download update software (S101). Specifically, the smart key wireless update control apparatus 100 may be configured to prepare an over-the-air update (OTA) in response to a case where download of new smart key software (S/W) through mobile communication is completed.

The smart key wireless update control apparatus 100 may be configured to determine whether at least one door among a plurality of doors of the vehicle is opened and a user enters or exits the vehicle (S102).

In response to a case where a user enters or exits the vehicle (YES in S102), the smart key wireless update control apparatus 100 may be configured to check a number of authentication devices in the vehicle (S103). In the instant case, the authentication devices may include a smart key, a digital key, etc.

The smart key wireless update control apparatus 100 may be configured to set a wireless update performance condition differently according to the number of authentication devices in the vehicle. In other words, in response to a case where there is one authentication device in the vehicle, the smart key wireless update control apparatus 100 may be configured to check that ignition is OFF and that the vehicle is stopped through a gear P position to ensure a stable wireless update environment.

In response to a case where there is one or more authentication devices in the vehicle, the smart key wireless update control apparatus 100 may be configured to perform a wireless update of the smart key not only during stop of the vehicle but also driving of the vehicle. On the other hand, in response to the case where there is one authentication method in the vehicle, the smart key wireless update control apparatus 100 may be configured to limit the wireless update of the smart key to be performed after the vehicle is stopped. This is to prevent a problem such as sudden stopping of the vehicle due to a problem occurring during the wireless update of the smart key while the vehicle is driving, as the smart key is related to starting the vehicle. However, in response to a case where there are two or more smart keys, while a first smart key is wirelessly updated, a second smart key may be used to control driving of the vehicle. Thus, although a problem occurs, such as an error with the smart key being wirelessly updated, problems such as errors in smart keys being wirelessly updated may be prevented from affecting vehicle driving.

In response to a case where there are not two or more authentication devices in the vehicle (NO in S103), the smart key wireless update control apparatus 100 may be configured to determine whether the authentication device in the vehicle is a smart key (S104).

In other words, in response to a case where a first authentication device in the vehicle is a smart key (YES in S104), the smart key wireless update control apparatus 100 may be configured to determine whether the vehicle is in an ignition-off state, the gear is in P, an exterior lamp is off, a hood is closed, and a remaining battery capacity of the vehicle is sufficient (S106). In the instant case, the smart key wireless update control apparatus 100 may be configured to receive a signal from another controller to determine the ignition-off state of the vehicle. Furthermore, the smart key wireless update control apparatus 100 may be configured to determine that the vehicle is in the ignition-off state in response to a case where the gear is in P. The smart key wireless update control apparatus 100 may be also configured to determine that the vehicle is in the ignition-off state in response to the exterior lamp being turned off. Furthermore, the smart key wireless update control apparatus 100 may be configured to determine that a state in which the hood is closed is not in a maintenance state. Furthermore, the smart key wireless update control apparatus 100 may be configured to check whether the remaining battery capacity of the vehicle is sufficient to prevent vehicle discharge while updating the smart key.

In other words, in response to the case where there is one authentication method in the vehicle, the smart key wireless update control apparatus 100 may be configured to perform the wireless update of the smart key in response to cases where the vehicle is in the ignition off state, the vehicle is not under maintenance, and the remaining battery capacity of the vehicle is sufficient.

In response to a case where all conditions of the step S106 are satisfied (YES in S106), the smart key wireless update control apparatus 100 may be configured to determine whether a remaining battery capacity of a coin battery in the smart key is sufficient (S107). In other words, for the wireless update of the smart key, not only the vehicle battery but also the battery of the smart key itself must be sufficient.

In response to a case where there are two or more authentication devices in the vehicle (YES in S103), the smart key wireless update control apparatus 100 may be configured to determine whether there two or more smart keys in the vehicle (S105).

In response to a case where there are two or more smart keys in the vehicle (YES in S105), the smart key wireless update control apparatus 100 may be configured to perform S107, as described above.

In response to a case where there are not two or more smart keys in the vehicle (NO in S105), the smart key wireless update control apparatus 100 may be configured to perform S104, as described above.

Next, in response to a case where the smart key is positioned inside the vehicle and the remaining battery capacity of the smart key is sufficient, the smart key wireless update control apparatus 100 may be configured to notify a user that a smart key update preparation is completed through the mobile communication terminal 300 of the user or the interface device of the vehicle 130 (S108).

Next, the smart key wireless update control apparatus 100 may be configured to output a text or screen to receive approval to start the wireless update of the smart key through the mobile communication terminal 300 of the user or the interface device 130 of the vehicle (S109). In response to receiving the approval from the user (YES in S109), the smart key wireless update control apparatus 100 may be configured to proceed to a process A.

Hereinafter, the process A is described in detail with reference to FIG. 4.

In response to a case where starting of the wireless update of the smart key is approved by a user, the smart key wireless update control apparatus 100 may be configured to starts updating the software through wireless communication (UWB, RF) with the smart key and (S110).

Next, the smart key wireless update control apparatus 100 may be configured to determine whether the wireless update of the smart key has been completed normally (S111). In other words, the smart key wireless update control apparatus 100 may be configured to determine whether the wireless update of the smart key has been completed without error.

In response to a case where the wireless update of the smart key is successfully completed (YES in S111), the smart key wireless update control apparatus 100 may be configured to determine whether the wirelessly updated smart key is a last smart key (S112).

For example, in response to a case where there are two or more smart keys, the smart key wireless update control apparatus 100 may be configured to check whether a second smart key that needs to be wirelessly updated remains after the wireless update of a first smart key is completed. The smart key wireless update control apparatus 100 may be configured to determine that there are no smart keys subject to the wireless update remaining after completing the wireless update of the second smart key.

In response to a case where there are no smart keys subject to the wireless update remaining, i.e., the wireless update of all smart keys in the vehicle is completed (YES in S112), the smart key wireless update control apparatus 100 may be configured to notify through the mobile communication terminal 300 of the user or the interface device 130 of the vehicle that the wireless update of the smart key has been successfully completed (S113). In the instant case, the smart key wireless update control apparatus 100 may be configured to notify progress of the wireless update of the smart key, whether a smart key exists in the vehicle, and the like through the mobile communication terminal 300 of the user or the interface device 130 of the vehicle. In the instant case, the smart key wireless update control apparatus 100 may be configured to output a pop-up text, etc. to the interface device 130 of the vehicle to provide notification.

Meanwhile, in response to a case where the wireless update of the smart key is not completed normally in the step S111 (NO in S111), the smart key wireless update control apparatus 100 may be configured to determine whether a number of wireless update restarts of the smart key is smaller than a predetermined number before restarting the wireless update of the smart key. The smart key wireless update control apparatus 100 may also be configured to increase the wireless update restart count of the smart key by 1 (S114). In response to a case where the number of wireless update restarts of the smart key is smaller than the predetermined number (YES in S114), the smart key wireless update control apparatus 100 may be configured to restart the wireless update of the smart key (S110). In the instant case, the number of restarts may be set in advance by an experimental value.

In response to a case where the number of wireless update restarts of the smart key is equal to or greater than the predetermined number (NO in S114), the smart key wireless update control apparatus 100 may be configured to no longer perform the wireless update of the smart key, to perform a rollback to an existing version of smart key software, and to notify that the wireless update of the smart key has failed through the mobile communication terminal 300 of the user or the interface device 130 of the vehicle (S115).

Accordingly, according to the present disclosure, software of the smart key in the vehicle may be wirelessly updated, and in response to a case where the smart key requires updating, replacement costs may be reduced and inconveniences such as visiting a service center may be eliminated. Furthermore, according to the present disclosure, restrictions on customer use of the vehicle may be minimized by enabling wireless update of the smart key not only under vehicle stopping conditions but also under driving conditions.

Figure 5:
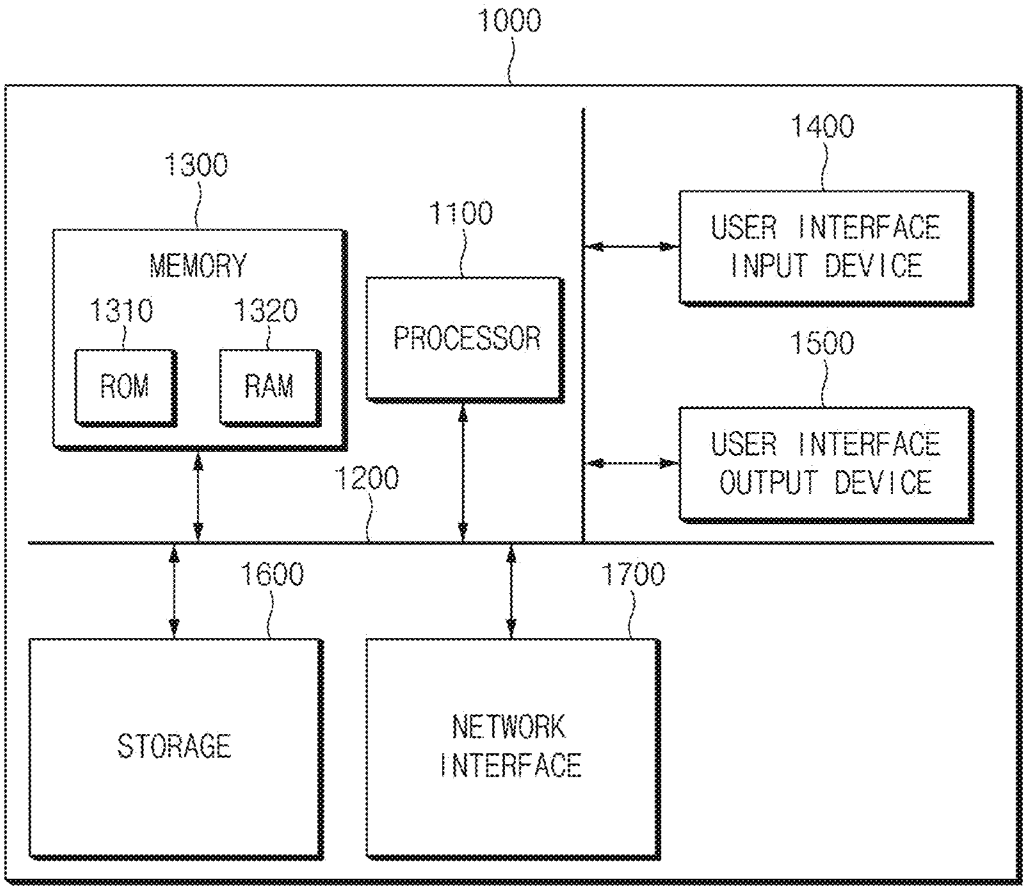
FIG. 5 illustrates an example computing system.

FIG. 5 illustrates an example computing system.

Referring to FIG. 5, the computing system 1000 includes at least one processor 1100, a memory 1300, a user interface input device 1400, a user interface output device 1500, and a storage 1600, and a network interface 1700, which are connected through a bus 1200.

The processor 1100 may be a central processing unit (CPU) or a semiconductor device that is configured to perform processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An storage medium is coupled to the processor 1100, which may read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description merely illustrates the technical idea of the present disclosure, and those having ordinary skill in the art to which the present disclosure pertains may make various modifications and variations without departing from the essential characteristics of the present disclosure.

Therefore, the embodiments disclosed in the present disclosure are not intended to limit the technical ideas of the present disclosure but to explain the technical ideas, and the scope of the technical ideas of the present disclosure is not limited by these embodiments. The protection range of the present disclosure should be interpreted by the claims below, and all technical ideas within the equivalent range should be interpreted as being included in the scope of the present disclosure.

What is claimed is:

1. A smart key wireless update control apparatus comprising:

an interface device;

a communication device configured to wirelessly receive information for a wireless update of smart key software from a server outside a vehicle;

a processor configured to perform the wireless update of the smart key software according to presence or absence of a smart key in the vehicle and a number of smart keys present in the vehicle while the vehicle is driving; and a storage configured to store data and algorithms driven by the processor, wherein the processor is configured to:

determine that there are two or more smart keys in the vehicle while the vehicle is driving;

determine whether a remaining battery capacity of a first smart key and a second smart key is greater than or equal to a first predetermined reference, and whether a remaining battery capacity of the vehicle is equal to or greater than a second predetermined reference;

in response to a case where the remaining battery capacity of the first smart key and the second smart key is greater than or equal to the predetermined first reference and the remaining battery capacity of the vehicle is equal to or greater than the predetermined second reference, notify a user, via the interface device, that a preparation for the wireless update of the smart key software of the first smart key and the second smart key is completed;

sequentially performing the wireless update of the smart key software of the first smart key and the second smart key, wherein while the first smart key is wirelessly updated the second smart key is used by the processor to control driving of the vehicle, and while the second smart key is wirelessly updated the first smart key is used by the processor to control driving of the vehicle; and in response to a case where the wireless update for all smart keys in the vehicle is completed, notify the user, via the interface device, that the wireless update for all smart keys in the vehicle is completed.

2. The smart key wireless update control apparatus of claim 1, wherein the processor is further configured to determine whether a smart key is present in the vehicle according to opening and closing of a door of the vehicle.

3. The smart key wireless update control apparatus of claim 1, wherein the processor is further configured, in response to a case where there is one smart key in the vehicle, to determine at least one of a case where a vehicle ignition is off, a case where the vehicle is not under maintenance, a case where a remaining battery capacity of the vehicle is equal to or greater than a predetermined reference, or a combination thereof.

4. The smart key wireless update control apparatus of claim 3, wherein the processor is configured to determine that the vehicle ignition is off in response to a case where a vehicle gear is in P or an exterior lamp is turned off.

5. The smart key wireless update control apparatus of claim 3, wherein the processor is configured to determine that the vehicle is under maintenance in response to a case where a hood of the vehicle is open.

6. The smart key wireless update control apparatus of claim 3, wherein the processor is configured to determine whether a battery state of the smart key is equal to or greater than a predetermined reference.

7. The smart key wireless update control apparatus of claim 1, wherein the interface device is configured to display progress details of the wireless update of the smart key software.

8. The smart key wireless update control apparatus of claim 7, wherein the processor is configured to control a notification to the interface device or a mobile communication terminal of the user that a preparation for the wireless update of the smart key software is completed in response to a case where a vehicle ignition is off, a case where the vehicle is not under maintenance, and a case where the remaining battery capacity of the vehicle is equal to or greater than the predetermined second reference.

9. The smart key wireless update control apparatus of claim 8, wherein the processor is configured to request approval from the user to start the wireless update of the smart key software through the interface device or the mobile communication terminal of the user after the preparation for the wireless update of the smart key software is completed, and in response to the approval by the user, start the wireless update of the smart key software.

10. The smart key wireless update control apparatus of claim 1, wherein the processor is configured to determine whether the wireless update of the smart key software has been successfully completed after the wireless update of the smart key software has been performed.

11. The smart key wireless update control apparatus of claim 10, wherein the processor is configured to determine whether the wireless update of both of the first smart key and the second smart key in the vehicle has been completed in response to a case where the wireless update of the smart key software is successfully completed.

12. The smart key wireless update control apparatus of claim 11, wherein the processor is configured, in response to a case where the wireless update of both of the first smart key and the second smart key in the vehicle is completed, to notify the user that the wireless update of the first smart key and the second smart key in the vehicle has been completed.

13. The smart key wireless update control apparatus of claim 11, wherein the processor is configured, in response to a case where the wireless update of the smart key software is not successfully completed, to start wireless updating of the software of the second smart key for which the wireless update has not been completed.

14. The smart key wireless update control apparatus of claim 10, wherein the processor is configured, in response to a case where the wireless update of the software of the first smart key fails, to determine whether a number of retries for the wireless update is smaller than or equal to a predetermined number.

15. The smart key wireless update control apparatus of claim 14, wherein the processor is configured to retry the wireless update of the software of the first smart key in response to a case where the number of retries for the wireless update is smaller than or equal to the predetermined number.

16. The smart key wireless update control apparatus of claim 14, wherein the processor is configured to perform a rollback to an existing version of the software of the first smart key, and to inform the user that the wireless update of the software of the first smart key has failed in response to a case where the number of retries for the wireless update exceeds the predetermined number.

17. A smart key wireless update control method comprising:

determining, by a processor, whether a smart key exists in a vehicle and a number of smart keys present in the vehicle;

wirelessly, by the processor, receiving information for a wireless update of smart key software from a server outside a vehicle while the vehicle is driving;

determining, by the processor, that there are two or more smart keys in the vehicle while the vehicle is driving;

determining, by the processor, that a remaining battery capacity of a first smart key and a second smart key is greater than or equal to a first predetermined reference, and that a remaining battery capacity of the vehicle is equal to or greater than a second predetermined reference;

notifying a user, by the processor via an interface device, that a preparation for the wireless update of the smart key software of the first smart key and the second smart key is completed;

sequentially performing, by the processor, the wireless update of the smart key software of the first smart key and the second smart key, wherein while the first smart key is wirelessly updated the second smart key is being used to control driving of the vehicle, and while the second smart key is wirelessly updated the first smart key is being used to control driving of the vehicle; and notifying the user, by the processor via the interface device, that the wireless update for all smart keys in the vehicle is completed.

* * * * *